United States Patent
Rolia et al.

(10) Patent No.: US 7,668,703 B1
(45) Date of Patent: Feb. 23, 2010

(54) DETERMINING REQUIRED CAPACITY FOR A RESOURCE

(75) Inventors: Jerry Rolia, Ontario (CA); Martin Arlitt, Alberta (CA); Thomas Turicchi, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 964 days.

(21) Appl. No.: 11/147,096

(22) Filed: Jun. 7, 2005

(51) Int. Cl.
*G06F 17/10* (2006.01)

(52) U.S. Cl. .......................... 703/2; 718/104; 709/201; 709/226

(58) Field of Classification Search .......... 703/2, 703/22; 709/201, 202, 223–226, 229; 718/102, 718/104
See application file for complete search history.

(56) References Cited

U.S. PATENT DOCUMENTS

| 7,020,697 | B1 * | 3/2006 | Goodman et al. | 709/223 |
| 2005/0010664 | A1 * | 1/2005 | Hubbard | 709/224 |

OTHER PUBLICATIONS

Andrzejak, A. et al., "Bounding the Resource Savings of Utility Computing Models", HP Labs Technical Report, HPL-2002-339, Internal Accession Date Dec. 2002.
Appleby, K. et al., "Oceano-SLA Based Management of a Computing Utitlity", downloaded Jun. 6, 2005.
Chase, J. S. et al., "Manageing Energy and Server Resources in Hosting Centers", downloaded Jun. 6, 200.
Pieper, J. et al., "High Level Cache Simulation for Heterogeneous Multiprocessors", DAC '04, ACM Press, Jun. 2004.
Hrischuk, C. E. et al., "Trace-Based Load Characterization for Generating Performance Software Models", IEEE Transactions on Software Engineering, Jan. 1999, Abstract only.
Rolia, J. et al., "Automating Enterprise Application Placement in Resource Utilities", 2003.
Singhal, S. et al., "Quartermaster—A Resource Utility System", HP Labs Technical Report, HPL-2004-152, Internal Accession Date Sep. 2004.
http://www.aogtech.com/, Asset Optimization Group, downloaded Jun. 6, 2005.
http://www.hp.com/go/PRM, HP Process Resource Manager, downloaded Jun. 6, 2005.
http://www.teamquest.com, TeamQuest, downloaded Jun. 6, 2005.

* cited by examiner

*Primary Examiner*—Russell Frejd

(57) ABSTRACT

One or more workloads are simulated on a resource, where each of the one or more workloads represents at least one application configured to run on the resource. A required capacity of the one or more workloads is determined based on the simulation.

29 Claims, 6 Drawing Sheets

DETERMINING REQUIRED CAPACITY FOR A RESOURCE

BACKGROUND

Grid computing services, utility-based data centers, and other types of resource-on-demand systems are becomingly increasingly popular as a highly scalable means for utilizing computer resources to meet the computing demands of users. However, managing these resource-on-demand systems is a difficult task that typically requires a significant amount of time and labor and which conventional network management software is not designed to handle.

Many management tasks are performed manually, which tends to be time consuming and costly. For example, selecting computer resources from a pool of resources to assign to a particular user's computing demands is typically performed manually. The monitoring of the pool of resources may be performed using conventional management tools. However, many administrators may be required, especially for large resource-on-demand systems such as large utility data centers, to make resource allocation decisions, resulting either in an ineffective use of resources or in costly and time-consuming management tasks.

SUMMARY

According to an embodiment, one or more workloads are simulated on a resource, where each of the one or more workloads represents at least one application configured to run on the resource. A required capacity of the one or more workloads is determined based on the simulation.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

For simplicity and illustrative purposes, the principles of the embodiments are described. However, one of ordinary skill in the art would readily recognize that the same principles are equally applicable to, and can be implemented using variations of the described embodiments.

A system and method for allocating resources from a shared pool of resource is described. A capacity manager simulates a workload or a set of workloads, referred to as a workload cluster, on a resource or set of resources to determine a required capacity. Each workload may include one or more applications that are configured to run on a resource or set of resources. A workload cluster may be assigned to run on one or more resources.

The capacity manager simulates a workload or workload cluster and determines whether the required capacity is less than the maximum capacity of the resource. The required capacity includes a capacity needed to run a workload or a workload cluster on a resource or set of resources that are being simulated by the simulator with the workload or the workload cluster. If the required capacity is less than the maximum capacity, the resource may be assigned to run the workload or workload cluster. The required capacity may be based on constraints. In one embodiment, the required capacity is the minimum capacity needed to run a workload or a workload cluster on a resource or set of resources that are being simulated and the minimum capacity needed to satisfy all resources access class of service constraints, which are described in further detail below.

Different variations are determined and simulated in order to identify a workload assignment that best satisfies objective(s) and satisfies constraints. A variation is workload or workload cluster that is different from a previous workload or workload cluster that has been simulated. In different embodiments, different algorithms, such as an objective attainment algorithm or a genetic algorithm, may be used to select variations for simulation. Constraints on application assignments, such as whether a pair of applications must not be placed on the same resource, whether a pair of applications must be placed on the same resource, or whether an application must be placed on a specific subset of resources, limit the feasible solutions for workload assignment and may be considered when determining variations so simulation resources are not wasted. Also, a scoring algorithm may be used to assign scores to the simulated variation sand to select a variation to implement as a workload assignment.

Figure 1:
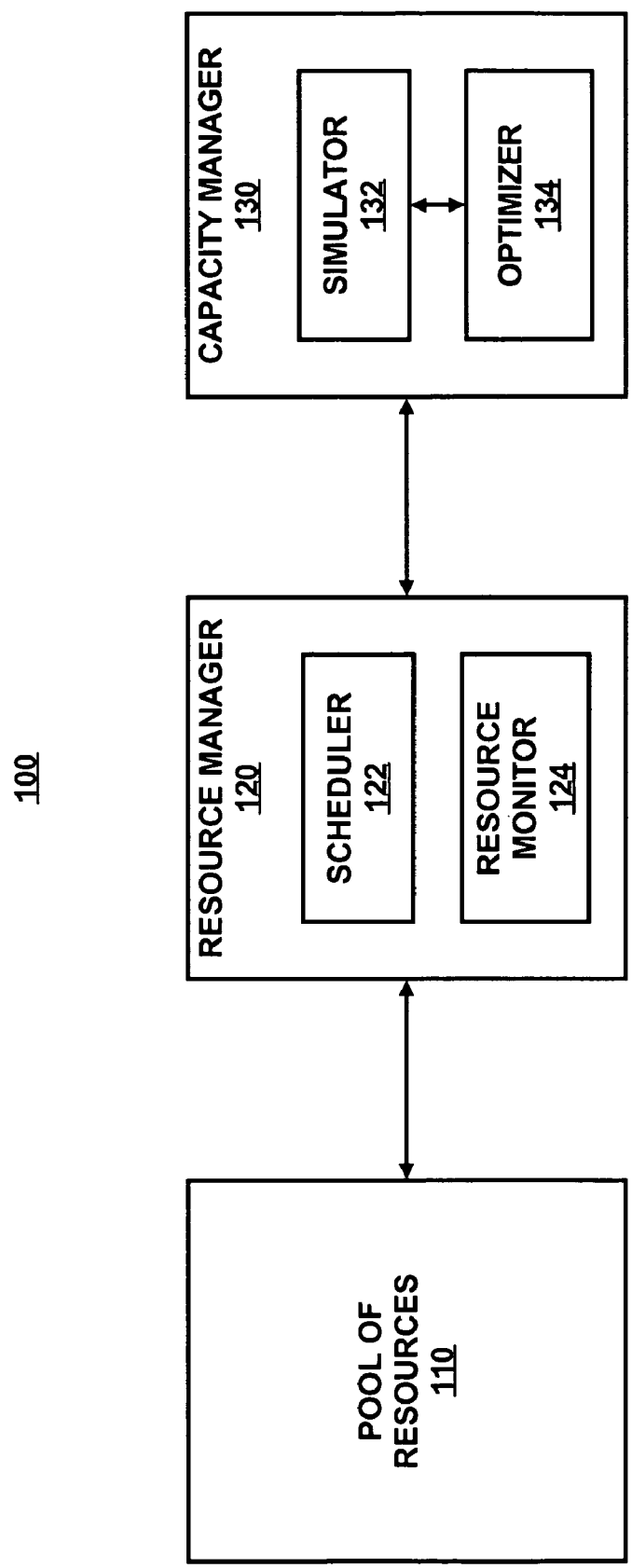
FIG. 1 illustrates a system for allocating resources, according to an embodiment.

FIG. 1 illustrates a system 100 according to an embodiment that provides computer resources on demand and is operable to adjust allocated computer resources as needed. The system 100 includes a pool of resources 110, a resource manager 120 and a capacity manager 130. The pool of resources 110 may include, for example, processors, input/output ("I/O") bandwidth, memory, etc. For example, the pool of resources 110 may include any type of resource available on servers or clusters of servers or racks of bladed servers that are to be shared by applications.

The resource manager 120 includes a scheduler 122 and a resource monitor 124. Each resource of the pool of resources 110 may include a resource manager 120. In other embodiments, each pool of resources may use a single resource manager or multiple pools of resources may use a single resource manager. The scheduler 122 schedules workloads to run on resources based on resource allocation assignments determined by the capacity manager 130. The scheduler 122 may divide a resource across a workload cluster. In other words, the resource may be allowed to multiple workloads in a workload cluster at any given time.

The resource monitor 124 monitors predetermined metrics of the resources in the pool of resources 110. For example, the resources may be represented using one or more capacity attributes, such as CPU, memory, I/O operation rates, and bandwidths. Other capacity attributes may be used and measured as is known in the art. The resource monitor 124 measures values for the capacity attributes. For example, workload A is measured to use 80% of the CPU time for a processor resource. The measured capacity attributes are referred to as traces and may be gathered continuously over time. The traces may be gathered on a per-server basis or a per-application workload basis. In one embodiment, if the traces are gathered on a per-server basis, the aggregate load on the server may be treated as a single workload for analysis. Traces capturing past workloads demands are used as a prediction of future demands and are used for simulating workload assignments performed by the capacity manager 130 as described with respect FIG. 2.

The capacity manager 130 determines a plan for assigning workloads to resources. The capacity manager 130 provides the resource manager 120 with instructions for assigning workloads to resources from the pool of resources 110 based on the plan.

The capacity manager 130 includes a simulator 132 and an optimizer 134. The simulator 132 receives traces from the resources monitor 124 and simulates variations based on the traces where specific applications are assigned to specific resources of the pool of resources 110. The optimizer 134 selects the best variation based on the objective(s) for optimization. A variation is a workload or a workload cluster that is varied from an initial set-up or prior variation and is simulated on a resource by the simulator 130. The variation may be changed during an optimization process to determine a best variation based on the objective(s) for optimization. For example, the objective for optimization may include load balancing, where workloads are spread out over a fixed number of resources to lessen the likelihood of service level violations, or consolidation, where workloads are packed on to the fewest number of resources possible. Another example of an objective includes problem solving where alternative assignments are recommended to lessen the impact of unexpected demands on a particular resource. The optimizer 134 selects a variation to simulate on a resource that is likely best suited to meet the objective(s).

The optimizer 134 may also establish several variations for the simulator 132 to simulate and ultimately one may be selected. The variations may be based on the objective of the optimizer 134, as discussed above. The simulator 132 simulates each of the variations forwarded by the optimizer 134, and, for example, assigns a score to each variation based on the objective(s) for optimization. The score may be based on results of the simulation and the objective(s). The scores are used to select a variation for implementation.

Different scoring algorithms may be used to assign scores to variations based on the objective. For example, suppose the objective is consolidation, and the resources used in the simulation include ten processors and the variation being simulated includes a workload cluster. The simulator 132 simulates the variation and packs the workload cluster on five of the ten processors. The results of the simulation show that all demands are satisfied using only five of the ten processors for the workload cluster being simulated. Then, the score may be high because several workloads are able to be allocated to fewer resources. In this example, a score is given for the assignment of all workloads to the resources they require, and this score gets used to select a variation. In another example, a score may be given on a per resource basis and the scores are used to calculate a final score used to select a variation. Given the same example where the workload cluster is packed onto five of the ten processors, a score is given for each processor. For example, a "1" is given for processors assigned to run a workload in the cluster and a "0" is given to processors that are not assigned to a workload. These numbers are summed to determine a final score. A variation with the lowest final score may be selected for consolidation. In another example, the objective is load leveling. The workload cluster is spread among the ten processors. A score is given for each of the ten processors based on the CPU utilization at the busiest times. For example, each processor is given a score between 1 and 10 based on the CPU utilization at the busiest times. A final score is determined for the variation based on the difference between the scores for each processor. For example, if all processors have the same score, then a high final score is given because the workload cluster is evenly distributed among the ten processors. It will be apparent to one of ordinary skill in the art that the scores may be calculated using other objective functions and based on other factors. For example, instead of CPU utilization, I/O bandwidth may be measured, or instead of measuring CPU utilization at the busiest times, CPU utilization may be determined over a time interval. In another example, CPU utilization may be a factor considered when the objective is consolidation, such as when the objective is to make the processors running the cluster as busy as possible. These and/or other factors may be considered separately or in conjunction for a scoring algorithm.

The optimizer 134 selects the variation with the best score and reports the selected variation as the best result. In another embodiment, the optimizer 134 may rank the variations and present them to a user, such that a user can select a variation to be implemented.

Figure 2:
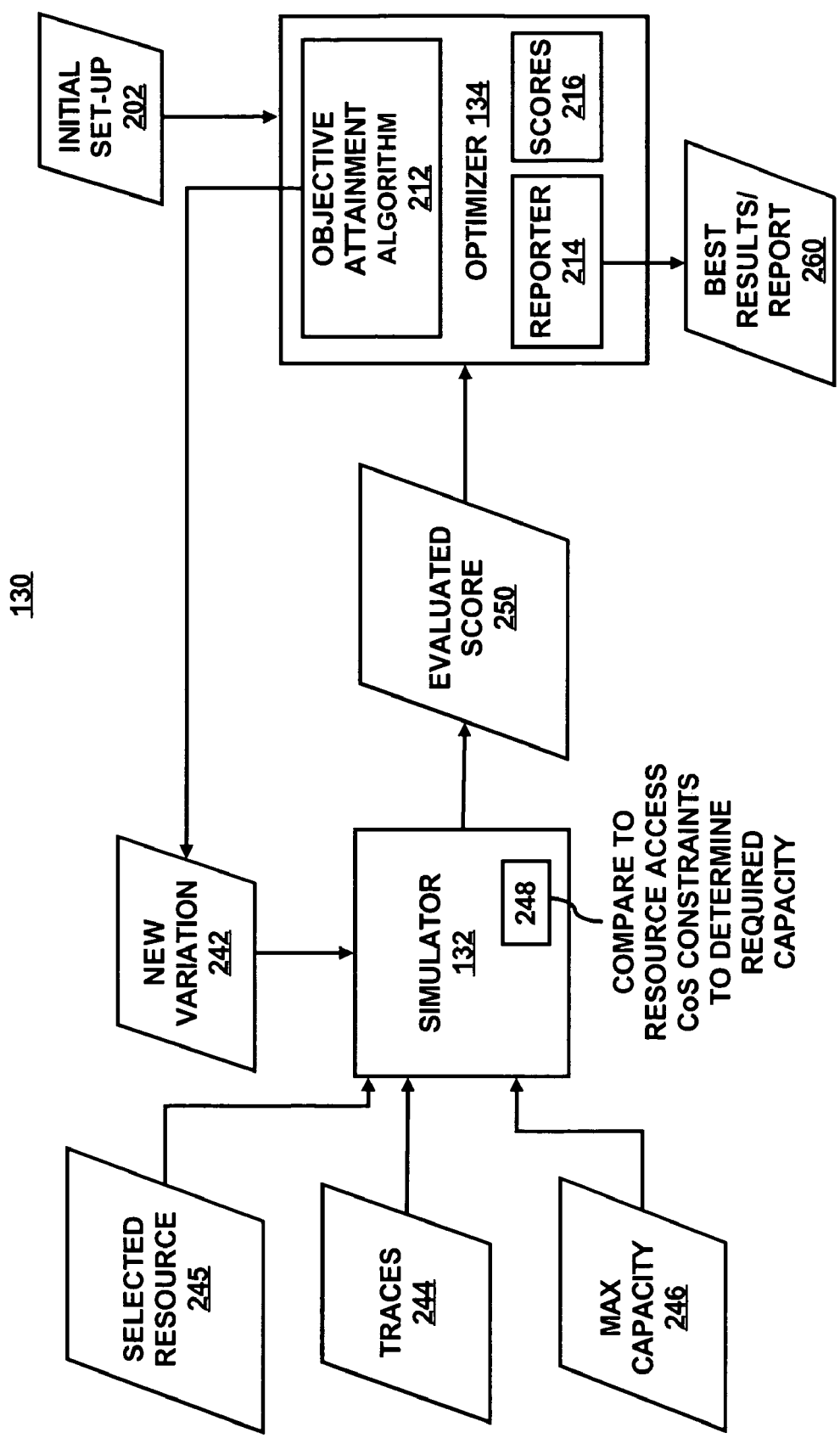
FIG. 2 illustrates a data flow diagram, according to an embodiment.

FIG. 2 illustrates a data flow diagram illustrating a process for allocating resources to workloads. As discussed above, the optimizer 134 forwards a new variation 242 of workloads to the simulator 132 for simulation of the new variation 242 on a selected resource 245 from the pool of resources 110 shown in FIG. 1. The selected resource 245 may be a set of resources, such as one or more processors, memory, I/O, and one or more servers. The new variation 242 may be based on an initial set-up 202 input into the optimizer 134. The initial set-up 202 may include a current configuration of a system, such as a current allocation of resources to workloads, may be chosen at random, or may be determined using an algorithm, such as one of the algorithms described below.

In one embodiment, new variations, such as the new variation 242, are determined based on the objective attainment algorithm 212. The objective attainment algorithm 212 may include a specific algorithm that allows attainment of the objective(s) of the optimization process. For example, a greedy algorithm may be used. In one example, the objective of the optimization process is packing as many workloads onto as few resources as possible, i.e., consolidation. The greedy algorithm may include selecting one or more clusters of workloads as the new variation 242 based on a cluster ratio. Each cluster ratio is a comparison of a required capacity of two or more workloads running together to the sum of the required capacity of all of the workloads in the variation when each workload is running by itself.

Another objective attainment algorithm that may be used to identify new variations, after the initial set-up has been run, includes a genetic algorithm. As is known in the art, a genetic algorithm may include an initializer function, a crossover function, and a mutation function. The genetic algorithm directs a search for a high scoring variation. The search is affected by the mutation and crossover functions. According to an embodiment, the mutation function is determined based on the objective for selecting a variation to be implemented.

Regarding the mutation function in general, one result of a simulation is a determination of the required capacity for the applications on each resource, such as described in detail below. The ratio of required capacity with total available capacity is the peak utilization of the resource. In general, the greater the concurrency of capacity within a resource, such as the more processors per multi-processor server, the higher the acceptable peak utilization for the resource. Many times it may be necessary to compare peak utilization of servers with different numbers of processors to select a server to run the workload or workload cluster. In one embodiment, the peak utilization of a resource, such as a server, is normalized to compare servers having different components, such as a different number of processors. For example, the optimizer 134 normalizes the peak utilization of a resource, referred to as U, by the power of P, namely power (U, P) where P is the number of processors on a multi-processor server. Normalized peak utilizations may then be compared even if the resources are different, such as having different numbers of processors. An example is described of normalizing values for a particular attribute of a resource, such as peak utilization. It will be apparent that resource may be compared by normalizing other attributes. For example, servers may be normalized based on a rating of the computer capacity of processors.

According to an embodiment, different resources are normalized, such as normalizing peak utilizations of different resources, in order to compare and select a resource to simulate or to run workloads based on an objective.

For example, the objective is consolidation. The mutation function is used to select a resource, such as the selected resource 245 shown in FIG. 2. For example, the selection is done using pseudo-random numbers. Each resource from a set of resources, such as the pool of resources 110 shown in FIG. 1, is given a weight based on its normalized peak utilization. The resources with the lowest normalized peak utilizations are given more weight than those with higher normalized utilizations. A pseudo-random number is used to select a resource 245 are then assigned to resources already being used. In this way the total number of resources used is decreased by one. This helps to find a solution that minimizes the number of resources that are used.

In another example, the objective is load leveling, where an attempt is made to divide the workload evenly across resources. In one embodiment, the mutation function is used to select a resource 245 that has the largest normalized peak utilization. One or more applications previously assigned to the selected resource 245 are then assigned to other resources.

In addition to using the objective attainment algorithm 212 to select new variations for simulation application assignment constraints may be considered. When searching for a new variation that best satisfies an objective, it is advantageous to consider only those alternative assignments that satisfy constraints to the problem. In one embodiment, constraints on application assignments, such as whether a pair of applications must not be placed on the same resource, whether a pair of applications must be placed on the same resource, or whether an application must be placed on a specific subset of resources, limit the variations that may be selected as the new variation 242. These constraints limit the feasible solutions for the optimizing search. Avoiding infeasible solutions ensures that simulation resources are not wasted.

For example, a list of constraints are used to identify sets of applications related by the constraints so that their assignments are governed together. For each such set, a specified number of alternative feasible assignments are pre-computed such that all constraints are satisfied for each of the assignments. Each feasible assignment for a set is associated with a unique index. This index defines how each application in its corresponding set is assigned to a resource for its particular assignment. Each feasible assignment may be used as the new variation 242 or the feasible assignments may be a set of variations, one or more of which may be selected by the objective attainment algorithm 212, for simulation.

The number of alternative feasible assignments for a set of applications related by the constraints so that their assignments are governed together could be very large. Yet an algorithm is needed to enumerate a diverse subset of these. The algorithm may be used to search for a number of the feasible assignments, one at a time. In one embodiment, a recursive depth first search algorithm is used to find a feasible assignment for the set. This assignment, which may be identified using a single index for the corresponding set of applications actually specifies the assignment of each application to a specific resource such that the constraints are satisfied. The algorithm uses pseudo-randomly generated probabilities to guide the search so that the assignments are likely to differ more significantly from one another in nature. The algorithm reports a feasible assignment (if one can be found) that differs from other assignments that may have been previously reported.

Once a number of distinct assignments have been pre-computed for all sets, the objective attainment algorithm 212 chooses amongst these application-set assignment indexes. For any particular combination of set assignment indexes, each application is associated with a particular resource. This information is used for the simulation.

In addition to constraints, corrections may be used to select the new variation 242. Simulating variations of workload clusters allows the capacity manager 130 to observe correlations between applications and use the correlations to better utilize capacity on resources. For example, if each application of a workload cluster having two applications uses 0.75 CPUs at its peak, a conventional management tool may assign 0.75 CPUs to each of the two applications, requiring allocation of 1.5 CPUs to the workload cluster. However, simulating the workload cluster may reveal that each application has its peak demand at alternating times. Thus, the two applications may be able to share 0.75 CPUs.

As shown in FIG. 2, the simulator 132 receives the new variation 242 as well as traces 244 of observed demands and a maximum capacity 246 of each resource as input. The simulator 132 emulates the assignment of the new variation 242 on the selected resource 245. The traces 244 may include traces received from a resource monitor, such as the resource monitor 124 shown in FIG. 1. The traces 244, for example, correspond to the previously measured demands of the workloads in the new variation 242. The maximum capacity 246 of the selected resource 245 may include a time-varying capacity of the resource. For example, if an attribute of the selected resource 245 includes bandwidth over a network, the bandwidth for the network may be higher at night than during the day or vice versa. Thus, the maximum capacity 246 may become a time-varying maximum capacity. The time-varying nature of the maximum capacity 246 is taken into account in the simulation process. Also, the required capacity also takes into account the time-varying capacity of workloads because the traces 244 used to determine the required capacity include observed, time-varying demands of workloads.

In one embodiment, the maximum capacity 246 may be included in the traces 244. For example, the maximum capacity 246 may be determined through analysis of the traces 244. In one embodiment, the maximum capacity 246 is the maximum capacity of the selected resource 245, which may be specified in manufacture specifications. In another embodiment, the maximum capacity 246 of the selected resource 245 may be less than the actual maximum capacity of the selected resource 245, which may be specified in manufacturer specifications. For example, if a goal of resource allocation is for the selected resource 245 to be used to 50% capacity, the maximum capacity 246 of the resource may be 50% of the selected resource 245. Thus, if the selected resource 245 is a processor, the maximum capacity 246 may be half of a processor in terms of CPU utilization.

The simulator 132 then compares the results of the simulation to constraints to determine the required capacity of the workloads at a processing block 248 of the simulator 132. Constraints may include minimum requirements that should be met when assigning workloads to resources. These minimum requirements may be provided in service level agreements and/or may be based on resources access class of service (CoS). Also, the constraints may include constraints on application assignment, such as whether an application for one entity may be run on the same hardware as an application for another entity. Constraints may include, for example, that two workloads must be together on a resource, two workloads must not be together on a resource (in other words, must be apart), a workload must reside on a specific list of resources, or any combination of such constraints.

The required capacity includes a capacity needed to run a workload or a workload cluster, such as the new variation 242, on the selected resource 245. The required capacity may be based on the constraints. In one embodiment, the required capacity is the minimum capacity needed to run the workload or workload cluster and satisfy all resources access CoS constraints.

According to an embodiment, a constraint, such as a CoS constraint or other type of constraint, may be expressed in terms of the capacity attributes, which are measured by the resource monitor 124 shown in FIG. 1. A search method, such as a binary search, may be used to find the required capacity for each capacity attribute specified in resources access CoS constraints.

The resource access CoS constraints refer to constraints for workloads assigned to a particular class of service. Different classes may have different constraints. In one embodiment a resource access CoS constraint may include a probability, $\theta$, and a deadline, s. The resource access probability, $\theta$, refers to the probability that a workload receives a unit of capacity when requested. Based on simulations performed by the simulator 132 for the new variation 242, an achieved resource access probability, $\theta$, and a deadline, s, are determined and compared to a resource access probability, $\theta$, and a deadline, s, specified in a resource access CoS constraint to determine whether a required capacity is met. As an example of different classes, interactive applications may be included in one class and batch applications may be included in another class. The class for the interactive applications may have a higher resource access probability, $\theta$, than the class for the batch applications, because batch application processing typically can be deferred without violating a SLA.

Each application may be assigned to a CoS. In one embodiment, when multiple CoS are involved, the simulator 132 may schedule access to capacity in the following way. Capacity is assigned to the highest priority, e.g., greatest $\theta$ value, CoS first. If a CoS does not have a probability of 1.0, then it is only offered its specified probability of access with remaining demands deferred to future intervals. The remaining capacity is assigned to the next lower CoS. This repeats for other lower CoS.

The resource access probability $\theta$ may be defined as follows. Let A be the number of workload traces 244 under consideration. Each trace has W weeks of observations with T observations per day as measured every m minutes. The motion of a week may be used as a timescale for service level agreements, however, other timescales may be used. Time of day captures the diurnal nature of interactive enterprise workloads (e.g., those used directly by end users). Other time scales and patterns may also be used. Each of the T times of day, e.g., 8:00 am to 8:05 am, is referred to as a slot. For 5 minute measurement intervals, there are T=288 slots per day.

Each slot, t, may be denoted using an index $1 \leq t \leq T$. Each day x of the seven days of the week has an observation for each slot t. Each observation has a measured value for each of the capacity attributes considered in the analysis.

To define resource access CoS more formally, one CoS and one capacity attribute that has a capacity limit of L units of demand may be considered. Let $D_{w,x,t}$ be the sum of the demands upon the attribute by the A workloads for week w, day x and slot t. The measured value of $\theta$ may be defined as:

$$\theta = \min_{w=1}^{W} \min_{t=1}^{T} \frac{\sum_{x=1}^{7} \min(D_{w,x,t}, L)}{\sum_{x=1}^{7} D_{w,x,t}}.$$

Thus, $\theta$ may be reported as the minimum resource access probability received any week for any of the T slots per day. Furthermore, let L' be the required capacity for a capacity attribute to support a CoS constraint. A required capacity L' may be the smallest capacity value, $L' \leq L$, to offer a probability $\theta'$ such that $\theta' \geq \theta$, and such that those demands that are not satisfied upon request, $D_{w,x,t} - L' > 0$, are satisfied within a deadline s. The deadline may be expressed as an integer number of slots s.

Those requests for units of capacity that are not received on demand may be deferred. Deferred units of capacity must be made available to the workload within the deadline s. If either part of the constraint is unsatisfied then there is a service level violation. The demands reflected in the traces are used to compute the empirical value for $\theta$ for the traces and/or the minimum capacity required to ensure that a CoS constraint is satisfied. Multiple CoS may be supported so that workloads with different needs may be accommodated.

Other constraints may be introduced into the simulator, such as application placement constraints. For example, some workloads must be hosted on separate resources for the purpose of availability. In another example, some workloads must be associated with specific resources because of licensing constraints.

The resource access probability $\theta$ is one example of a QoS metric that may be used to determine whether a variation may be satisfactory even if demands exceeds supply. Other metrics may also be used.

Figure 3:
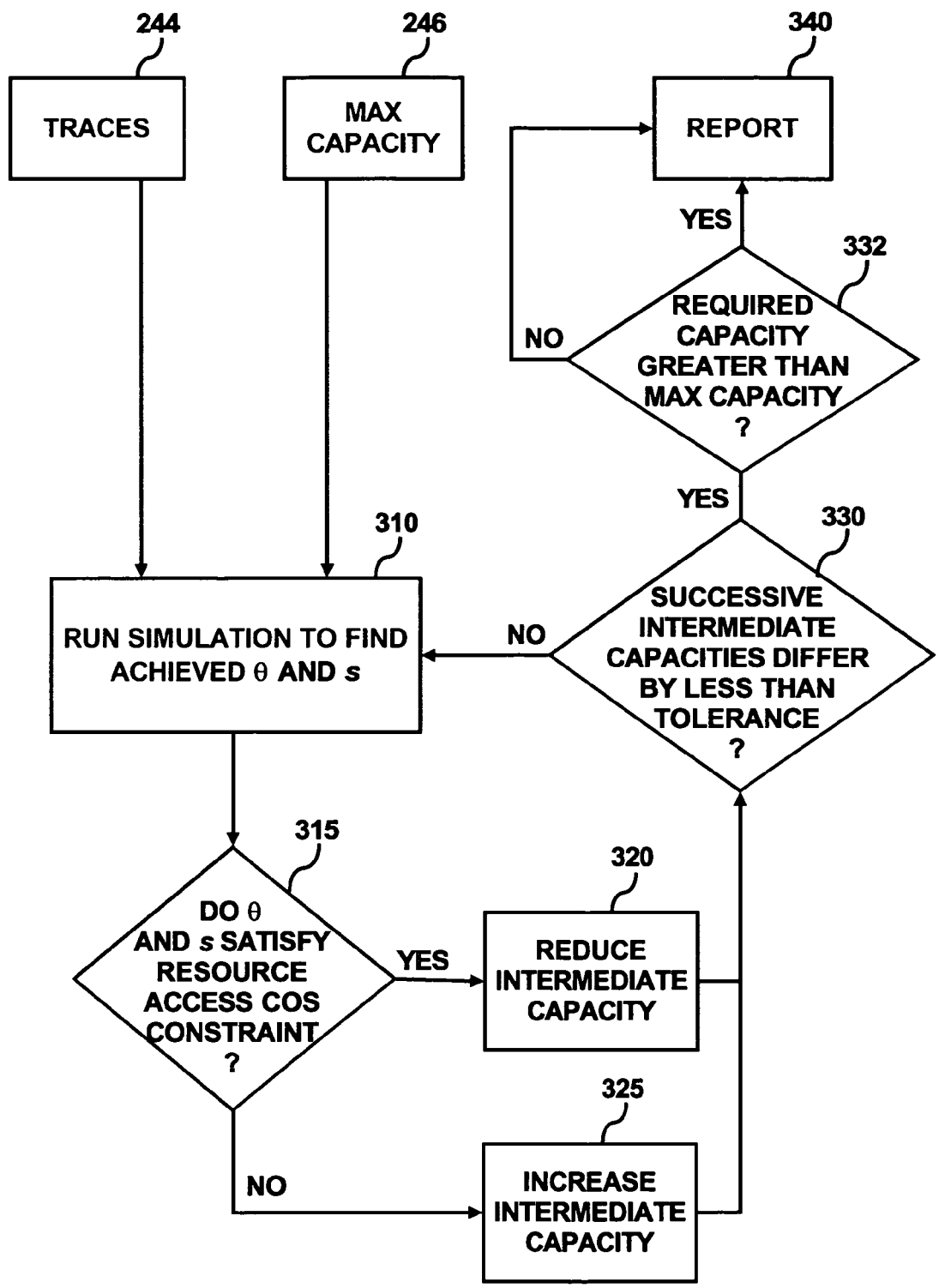
FIG. 3 illustrates a data flow diagram for a simulating algorithm, according to an embodiment.

FIG. 3 illustrates a data flow diagram for a simulation algorithm that may be performed by the simulator 132 shown in FIG. 2 for determining a required capacity of workload or workload cluster being simulated. The simulator 132 may perform a plurality of simulations for each configuration to determine the required capacity. In the example described below, the workload being simulated is the new variation 242 simulated on the selected resource 245 shown in FIG. 2.

At processing block 310, the simulator 132 runs a simulation to determine the achieved $\theta$ and s. The processing block 310 may receive the inputs of traces 244 and maximum capacity 246 of the selected resource 245 in addition to the new variation 242. The simulation may include replaying the traces 244, comparing the aggregate demand of the observations in the traces with the capacity of the selected resource 245, and computing the resource access CoS statistics, $\theta$ and s. A search method, such as a binary search, may be used to find the required capacity for each capacity attribute such that the CoS constraints are satisfied.

The simulator 132 determines the required capacity of the new variation 242 shown in FIG. 2 by fine tuning an intermediate required capacity after each simulation. For example, at processing block 315, the simulator 132 determines if the achieved θ and s satisfy the resource access CoS constraints. If resource access CoS constraints are satisfied after a simulation, the simulator 132 may reduce the intermediate required capacity of the workload or workload cluster being simulated at processing block 320. If the resource access CoS constraints are not satisfied after a simulation, the intermediate required capacity of the resource may be increased at processing block 325.

The simulator 132 may then determine, at processing block 330, if the intermediate required capacity differs from the previously determined intermediate capacity by less than a tolerance. For example, a previous run of the steps shown in FIG. 3 determines a first intermediate capacity. A current run determines a second intermediate capacity which may be an increase or a decrease performed at blocks 325 or 320 from the first intermediate capacity. A difference between the first and second intermediate capacities is compared to a tolerance. If the difference is greater than a tolerance than another intermediate capacity may be determined. If the difference is less than the tolerance, then the current intermediate capacity becomes the required capacity of the new variation 242.

At processing block 332, the required capacity is compared to the maximum capacity 246 of the selected resource 245. If the maximum capacity 246 is exceeded, then the simulator 132 reports at block 340 that the new variation 242 cannot be supported by the selected resource 245 while the resource access CoS constraints are satisfied. Another resource may then be selected.

If successive intermediate required capacities differ by less than the tolerance at block 330, the simulator 132 reports at block 340 that there is sufficient capacity in the selected resource 245 to provide the required capacity of the new variation 242. The selected resource 245 becomes a candidate for running the new variation 242. Other resources may also be determined to be candidates using the same steps. As described above, candidates may be assigned scores and the candidate with the best score may be selected and assigned the workload or workload cluster.

The report of sufficient capacity to meet the required capacity is shown as the evaluated score 250 in FIG. 2 and is provided to the optimizer 134. The resource with the score 250, such as the selected resource 245, becomes a candidate to be assigned the workload or workload cluster of, for example, the new variation 242. The optimizer 134 may store the received scores in a scores store 216. In one example, the scores may include a measure of how well a capacity of a resource being simulated is able to satisfy a required capacity. For example, if a resource has a 10% over provisioning above the required capacity versus a 2% over provisioning above the required capacity, the resource with 10% over provisioning may be given a higher score if the objective is to provide a high degree of assurance of satisfying the required capacity. Other techniques may be used to determine the scores 216. The reporter 214 reports the best results in a best results report 260 as shown in FIG. 2.

The steps or processing blocks shown in FIG. 3 may be used to calculate required capacity for multiple attributes of a resource, each of which may be computed separately, so that the required capacity is determined for each attribute. Examples of attributes may include such as CPU utilization, memory, I/O operation rates, and bandwidths. The required capacity for each attribute together may be used to calculate the score for the resource.

Figure 4:
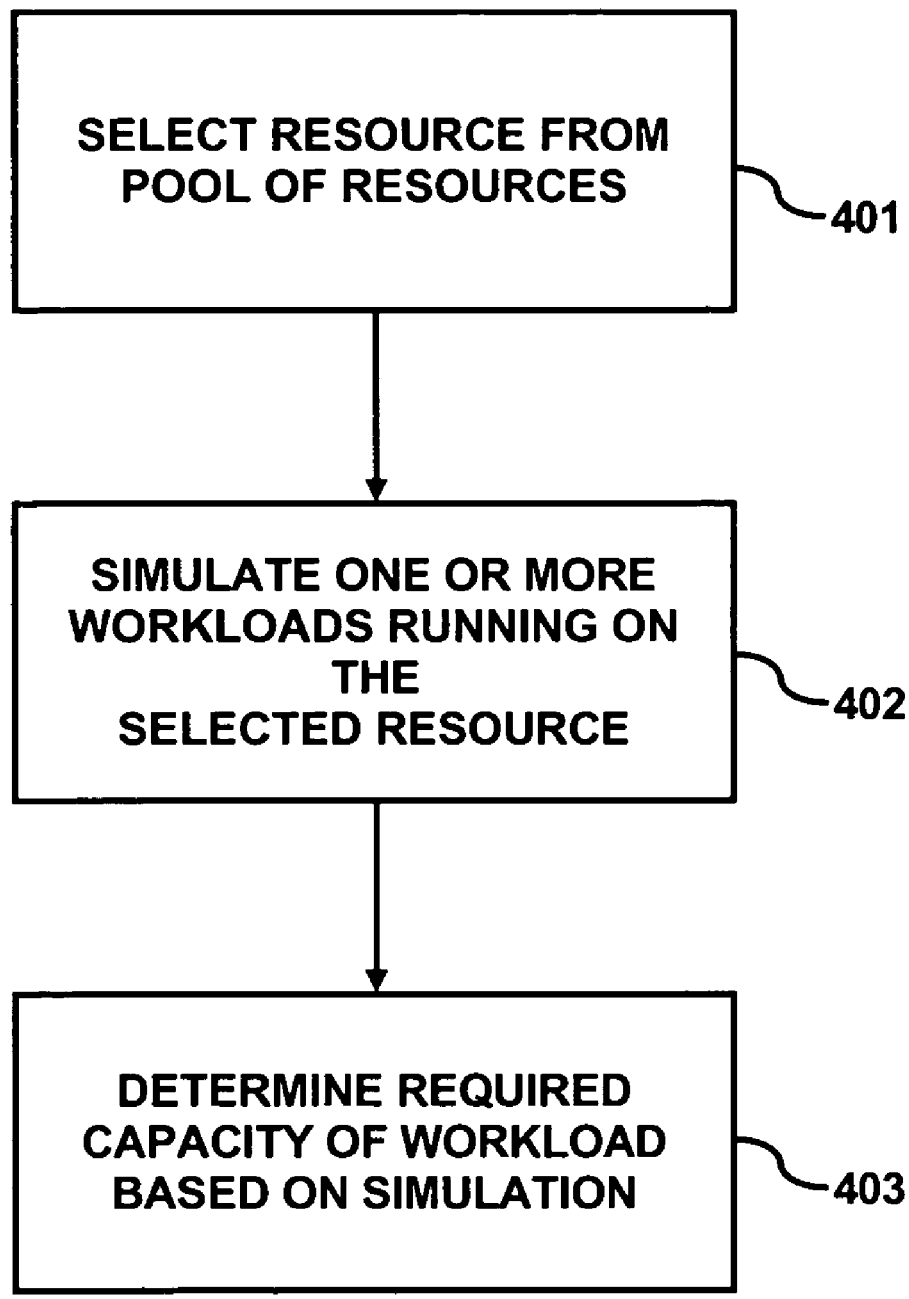
FIG. 4 illustrates a flow diagram for allocating resources, according to an embodiment.

FIG. 4 illustrates a flow chart of a method 400 for allocating resources. The method 300 is described with respect to FIGS. 1-3 by way of example and not limitation.

At step 401, a capacity manager, such as the capacity manager 130 shown in FIG. 1, selects a resource from a pool of resources 110, such as the selected resource 245 shown in FIG. 2, which may include a set of resources. At step 402, the capacity manager 130 simulates one or more workloads, such as the new variation 242 shown in FIG. 2, on the selected resource 245. Each of the one or more workloads may represent at least one application configured to run on the resource. In one embodiment, an objective attainment algorithm, such as a greedy algorithm or a genetic algorithm may be used to identify one or more workload clusters to simulate on the resource. In another instance, the workload cluster to simulate may be based on an initial set-up. For example, the workload cluster may be a workload cluster already running on the resource. In another example, the workload cluster may be selected by user input. In another example, the capacity manager may select one or more permutations of the workloads available to run on the resource as a workload cluster to simulate. The simulation may be performed by a simulator 134 as described above with respect to FIGS. 2 and 3 at step 402.

At step 403, the capacity manager 130 determines the required capacity of the workloads based on the simulation. The required capacity of the workloads may be used to determine a score for the workloads on the resource. The steps 402-403 may be repeated for other variations of workloads for each resource. The determined score for each variation of workloads may be used to determine an assignment of workload clusters for each resource.

Figure 5:
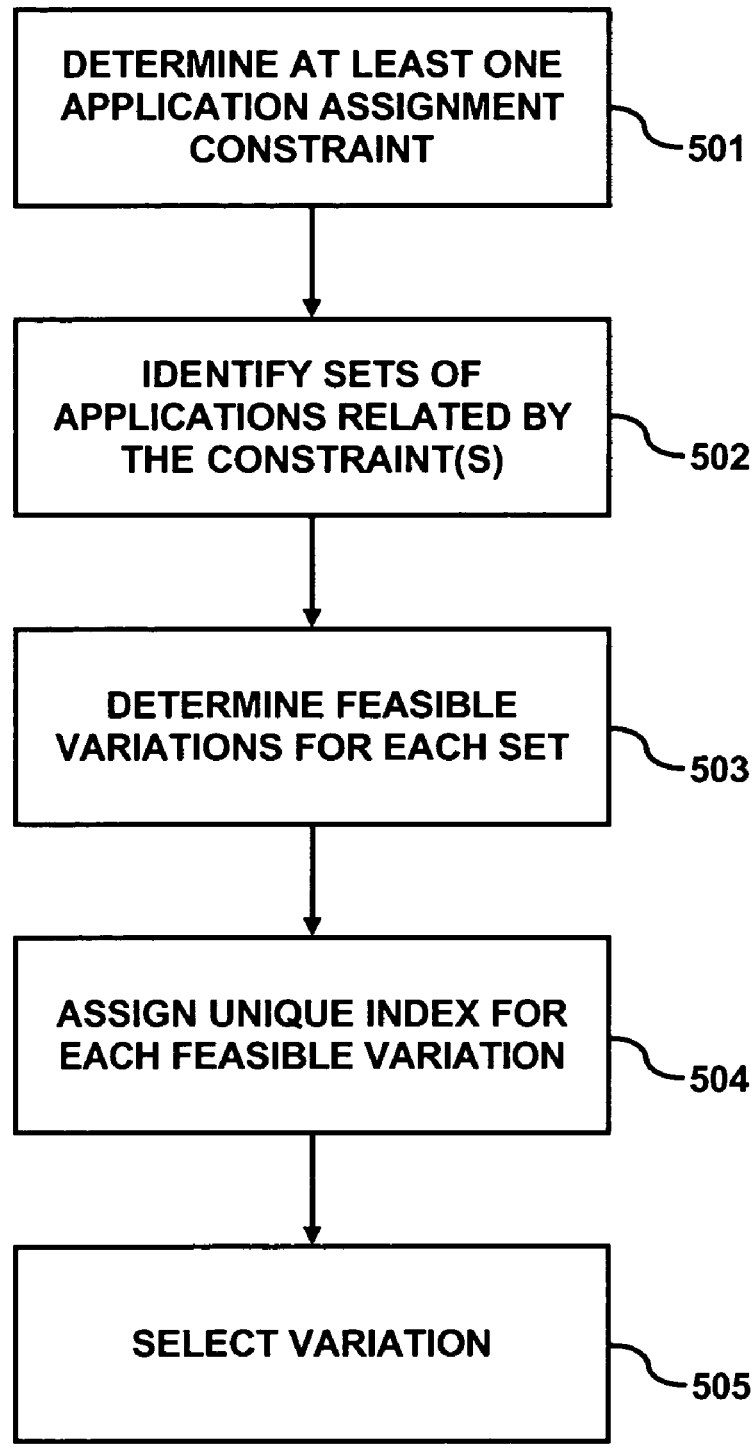
FIG. 5 illustrates a flow diagram for selecting variations of workloads, according to an embodiment.

FIG. 5 illustrates a flow chart of a method 500 for selecting one or more new variations, such as the new variation 242, based on application assignment constraints. The steps of the method 500 may be used to select one or more workloads to simulate at step 402 of the method 400 shown in FIG. 4. The method 400 is described with respect to FIGS. 1-3 by way of example and not limitation.

At step 501, at least one application assignment constraint is determined, for example, by the capacity manager 130 or a system administrator. When searching for a new variation that best satisfies an objective, it is advantageous to consider only those alternative assignments that satisfy constraints to the problem. In one embodiment, constraints on application assignments, such as whether a pair of applications must not be placed on the same resource, whether a pair of applications must be placed on the same resource, or whether an application must be placed on a specific subset of resources, limit the variations that may be selected as the new variation 242. These constraints limit the feasible solutions for the optimizing search performed by the optimizer 134. Avoiding infeasible solutions ensures that simulation resources are not wasted. Application assignment constraints may be specified in service level agreements (SLA's) or through other ways.

At step 502, the capacity manager 130 identifies sets of applications related by the constraints identified at step 501. For example, assignment of all the applications in a set is considered when assigning each application in the set to a resource. For example, this may include sets of applications that must be assigned to the same resource as specified in an SLA or sets of applications that must be assigned to different resources.

At step 503, for each set identified at step 502, the capacity manager 130 determines a predetermined number of alternative feasible assignments to resources, i.e., variations or set of variations that are feasible because they satisfy the constraints, such that all the constraints are satisfied for each of the assignments. The number of alternative feasible assignments for a set of applications related by the constraints so that their assignments are governed together could be very large. An algorithm may be used to search for the feasible assignments, one at a time. In one embodiment, a recursive depth first search algorithm is used to find a feasible assignment for the set. This assignment, which may be identified using a single index for the corresponding set of applications, specifies the assignment of each application to a specific resource such that the constraints are satisfied. The algorithm uses pseudo-randomly generated probabilities to guide the search so that the assignments are likely to differ more significantly from one another in nature. The algorithm reports a feasible assignment (if one can be found) that differs from other assignments that may have been previously reported.

At step 504, the capacity manager 130 assigns a unique index for each feasible variation. This index defines how each application in its corresponding set is assigned to a resource for its particular assignment. Any of the variations determined at step 503 may be used as the new variation 242.

At step 505, the capacity manager 130 uses, for example, the objective attainment algorithm 212, to select the new variation 242 from the variations determined at step 503. For any particular combination of set assignment indexes, each application is associated with a particular resource. This information is used for the simulation.

Many of the steps of the method 500 are described with respect to the capacity manger 130 performing the steps. It will be apparent to one of ordinary skill in the art that one or more of the steps of the method 500 may be performed by another computer system or by a system administrator.

Figure 6:
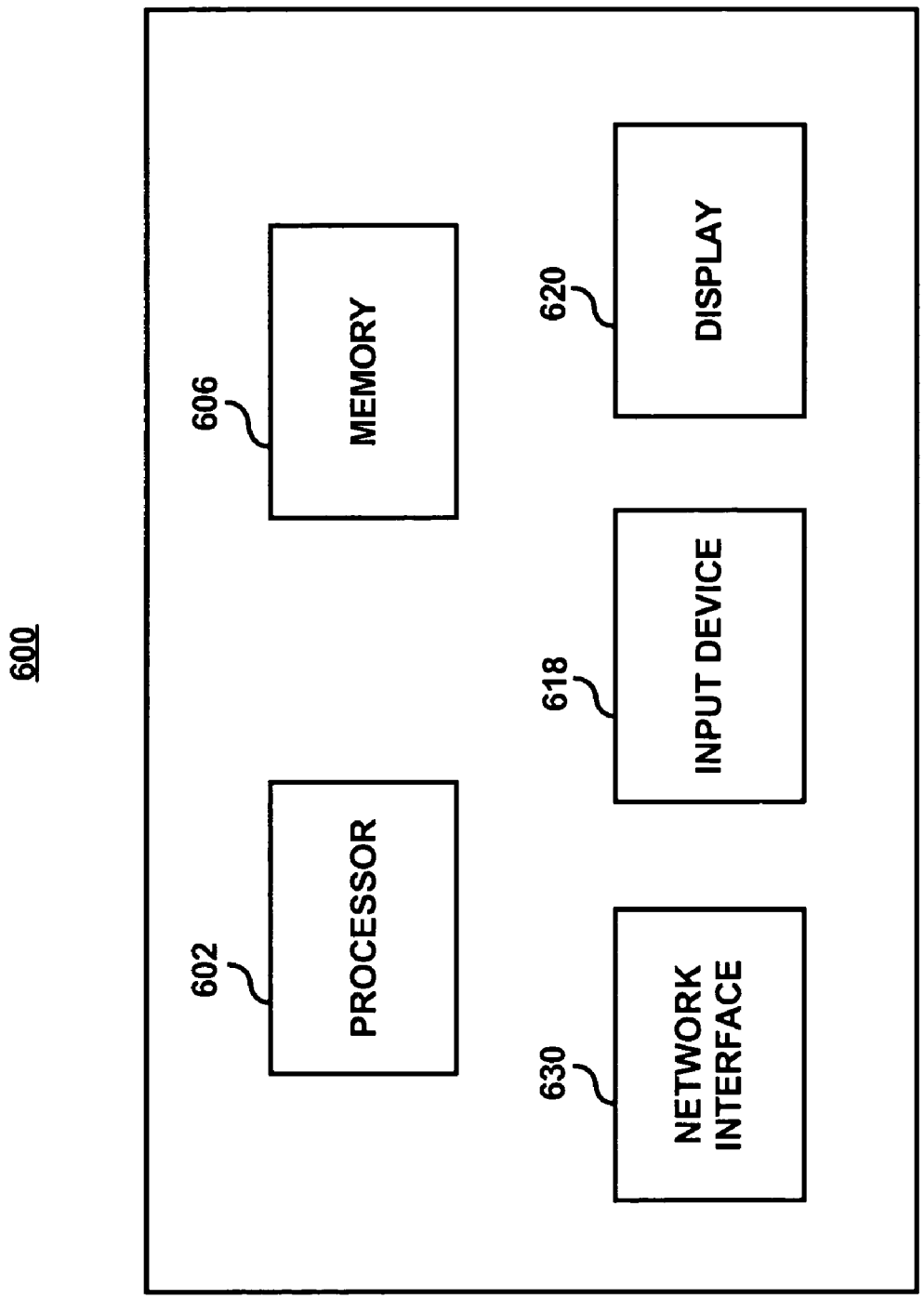
FIG. 6 illustrates a computer system, according to an embodiment.

Referring to FIG. 6, and also with reference to FIG. 1, a schematic diagram of a computer system 600 is shown in accordance with an embodiment. The computer system 600 shown may be used as the system for allocating resources shown in FIG. 1. The computer system 600 may include one or more processors, such as processor 602, providing an execution platform for executing software. The computer system 600 also includes a memory 606, which may include Random Access Memory (RAM) where software is resident during runtime. Other types of memory such as ROM (read only memory), EPROM (erasable, programmable ROM), EEPROM (electrically erasable, programmable ROM) and data storage, such as hard disks, etc., may be used.

A user interfaces with the computer system 600 with one or more input devices 618, such as a keyboard, a mouse, a stylus, and the like and a display 620. A network interface 630 is provided for communicating with other computer systems. It will be apparent to one of ordinary skill in the art that FIG. 6 is meant to illustrate a generic computer system. Any type of computer system may be used. Furthermore, one or more components of the components of the computer system 600 are optional, such as the display and input devices, and other types of components may be used or substituted as is known in the art.

One or more of the steps of the methods 400-500 and the steps described with respect to FIG. 3 may be implemented as software embedded or stored on a computer readable medium, such as the memory 606, and executed by the processor 602. The steps may be embodied by a computer program, which may exist in a variety of forms both active and inactive. For example, there may exist as software program(s) comprised of program instructions in source code, object code, executable code or other formats for performing some of the steps when executed. Any of the above may be stored on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method comprising:

using a computer, selecting a resource from a pool of resources;

simulating one or more workloads on the resource, each of the one or more workloads including at least one application;

determining a required capacity of the one or more workloads based on the simulation;

determining whether the required capacity is less than a maximum capacity of the resource; and selecting the resource as a candidate for running the one or more workloads in response to the required capacity being less than a maximum capacity of the resource.

2. The method of claim 1, further comprising:

determining a class for the at least one application in each workload;

determining resources access CoS constraints for the class; and wherein determining a required capacity further comprises determining a minimum capacity needed to satisfy resources access CoS constraints for each class.

3. The method of claim 1, wherein determining a required capacity further comprises:

determining whether resource access CoS constraints for the at least one application are satisfied based on the simulation.

4. The method of claim 3, wherein determining whether resource access CoS constraints for the at least one application are satisfied further comprises:

determining a probability that the at least one application receives a unit of capacity when requested; and determining whether requests for units of capacity that are not received on demand are deferred greater than a predetermined period of time.

5. The method of claim 3, wherein determining the required capacity comprises:
increasing an intermediate required capacity if the CoS constraints are not satisfied and decreasing an intermediate required capacity if the CoS constraints are satisfied.

6. The method of claim 5, wherein determining the required capacity comprises:
determining if successively determined intermediate capacities differ by less than a tolerance; and
selecting the current intermediate capacity as the required capacity if the successively determined intermediate capacities differ by less than the tolerance.

7. The method of claim 1, wherein simulating the one or more workloads further comprises:
simulating variations of workload clusters; and
assigning a result of each simulation a score based on a comparison of the determined required capacity of each variation to a maximum capacity of the resource.

8. The method of claim 7, further comprising:
selecting one or more variations to run on the resource based on a comparison of the scores.

9. The method of claim 1, wherein determining a required capacity of the one or more workloads based on the simulation further comprises:
determining a required capacity for each of multiple attributes of the resource based on one or more simulations; and
determining whether the resource is a candidate for running the one or more workloads based on the required capacities.

10. The method of claim 1, further comprising:
using a greedy algorithm to identify the one or more workloads, the greedy algorithm comprising selecting one or more clusters of workloads based on a cluster ratio, wherein each cluster ratio is a comparison of a required capacity of two or more workloads running together to the sum of the required capacity of all of the workloads in the variation when each workload is running by itself.

11. The method of claim 1, further comprising:
using a genetic algorithm to identify the one or more workloads.

12. The method of claim 1, wherein selecting a resource further comprises:
normalizing resources operable to be selected;
comparing the normalized resources; and
selecting one of the resources based on an objective.

13. The method of claim 12, further comprising:
assigning weights to each of the resources based on the normalization and the objective; and
selecting one of the resources comprises selecting one of the resources based on at least on of the weights and a random selection.

14. The method of claim 12, further comprising:
assigning a previously assigned workload of the selected resource to at least one other resource.

15. The method of claim 1, further comprising:
simulating variations of workload clusters;
observing correlations between applications in the workload clusters; and
selecting the one or more workloads based on the observed correlations.

16. The method of claim 1, further comprising:
determining the one or more workloads that are simulated based on at least one application assignment constraint.

17. The method of claim 1, wherein the required capacity is based on time-varying workload demands.

18. The method of claim 1, wherein the maximum capacity of the resource is a time-varying maximum capacity of the resource.

19. A resource allocation system comprising:
a pool of resources, each resource of the pool of resources configured to run one or more applications; and
a capacity manager configured to allocate one or more workloads to at least one resource of the pool of resources based on a determined required capacity of the one or more workloads, each workload including at least one of the one or more applications, and
wherein the required capacity is based on time-varying workload demands.

20. The system of claim 19, wherein the capacity manager comprises:
a simulator configured to simulate one or more workload clusters on a selected resource from the pool of resources to determine a required capacity for each of the workload clusters for the specified resource; and
an optimizer configured to determine the one or more workloads to allocate to the specified resource based on the required capacities of each of the workload clusters for the specified resource.

21. The system of claim 20, wherein the optimizer is further configured to identify the one or more clusters to simulate based on at least objective.

22. The system of claim 19, wherein the determined required capacity of the one or more workloads comprises a required capacity determined for each of multiple attributes of the at least one resource.

23. An apparatus comprising:
means for selecting a resource from a pool of resources;
means for simulating one or more workloads on the resource, each of the one or more workloads including at least one application configured to run on the resource;
means for determining a required capacity of the one or more workloads based on the simulation;
means for determining whether the required capacity is less than a maximum capacity of the resource; and
means selecting the resource as a candidate for running the one or more workloads in response to the required capacity being less than a maximum capacity of the resource.

24. The apparatus of claim 23, further comprising:
means for selecting a plurality of variations to be simulated by the means for simulating based on at least one objective.

25. A computer readable storage medium on which is embedded one or more computer programs, said one or more computer programs, when executed on at least one computer system, implementing a method of allocating workloads to resources, said one or more computer programs comprising a set of instructions for:
selecting a resource from a pool of resources;
simulating one or more workloads on the resource, each of the one or more workloads including at least one application configured to run on the resource;
determining a required capacity of the one or more workloads based on the simulation;
determining whether the required capacity is less than a maximum capacity of the resource; and
selecting the resource as a candidate for running the one or more workloads in response to the required capacity being less than a maximum capacity of the resource.

26. A method comprising:
  using a computer, determining at least one application assignment constraint for assigning applications to a resource;
  identifying sets of applications related by the at least one constraint such that assignment of all the applications in a set is considered when assigning each application in the set to the resource;
  determining a predetermined number of feasible variations for each set; and
  selecting one of the sets to simulate on a resource or to assign to a resource.

27. The method of claim 26, wherein identifying sets of applications related by the at least one constraint further comprises:
  uses pseudo-randomly generated probabilities to determine the feasible variations such that each variation is likely to differ from another variation.

28. The method of claim 26, wherein selecting one of the sets further comprises:
  selecting one of the sets using an objective attainment algorithm to identify a set that is likely to satisfy an objective.

29. The method of claim 26, further comprising:
  determining a required capacity of the selected set;
  determining whether a maximum of capacity of the resource is greater than the required capacity; and
  assigning the set to run on the resource in response the maximum capacity being greater than the required capacity.

* * * * *

UNITED STATES PATENT AND TRADEMARK OFFICE
CERTIFICATE OF CORRECTION

| | | |
|---|---|---|
| PATENT NO. | : 7,668,703 B1 | Page 1 of 1 |
| APPLICATION NO. | : 11/147096 | |
| DATED | : February 23, 2010 | |
| INVENTOR(S) | : Jerry Rolia et al. | |

It is certified that error appears in the above-identified patent and that said Letters Patent is hereby corrected as shown below:

In column 5, line 29, after "245" insert -- with a higher weight. The applications previously assigned to the selected resource 245 --.

In column 13, line 52, in Claim 13, delete "on" and insert -- one --, therefor.

In column 14, line 27, in Claim 21, after "least" insert -- one --.

Signed and Sealed this

Third Day of August, 2010

David J. Kappos
*Director of the United States Patent and Trademark Office*